United States Patent
Kondo et al.

(10) Patent No.: US 11,537,779 B2
(45) Date of Patent: Dec. 27, 2022

(54) INSPECTION IMAGE DISPLAY CONTROL METHOD, INSPECTION IMAGE DISPLAY CONTROL APPARATUS AND INSPECTION IMAGE DISPLAY CONTROL SYSTEM

(71) Applicant: Evident Corporation, Nagano (JP)

(72) Inventors: Takumi Kondo, Chofu (JP); Wakako Nagatsuma, Moriya (JP)

(73) Assignee: EVIDENT CORPORATION, Nagano (JP)

( * ) Notice: Subject to any disclaimer, the term of this patent is extended or adjusted under 35 U.S.C. 154(b) by 145 days.

(21) Appl. No.: 16/396,830

(22) Filed: Apr. 29, 2019

(65) Prior Publication Data

US 2019/0347312 A1    Nov. 14, 2019

(30) Foreign Application Priority Data

May 14, 2018    (JP) .............................. JP2018-093036

(51) Int. Cl.
   *G06F 40/106*    (2020.01)
   *G09G 5/14*    (2006.01)

(52) U.S. Cl.
   CPC ............. *G06F 40/106* (2020.01); *G09G 5/14* (2013.01)

(58) Field of Classification Search
   None
   See application file for complete search history.

(56) References Cited

U.S. PATENT DOCUMENTS

| | | | |
|---|---|---|---|
| 6,185,540 B1* | 2/2001 | Schreitmueller | G06Q 40/08 705/4 |
| 10,217,207 B2* | 2/2019 | Marra | G05D 1/0094 |
| 2004/0218806 A1* | 11/2004 | Miyamoto | G06K 9/6253 382/145 |
| 2008/0247636 A1* | 10/2008 | Davis | G09G 5/00 382/152 |
| 2009/0225102 A1 | 9/2009 | Okubo et al. | |
| 2011/0050888 A1* | 3/2011 | Shibukawa | H04N 1/00411 348/135 |
| 2011/0141463 A1* | 6/2011 | Chikamatsu | G01N 21/956 356/237.5 |

(Continued)

FOREIGN PATENT DOCUMENTS

| | | |
|---|---|---|
| JP | 2005-085200 A | 3/2005 |
| JP | 2007-117467 A | 5/2007 |

(Continued)

*Primary Examiner* — Ariel Mercado

(74) *Attorney, Agent, or Firm* — Scully, Scott, Murphy & Presser, P.C.

(57) ABSTRACT

A control method for displaying inspection images causes a processor to display an image of a model of an inspection object including a plurality of inspection sites, in a first display region and display first inspection information relevant to at least one inspection site, in a second display region, where the at least one inspection site is selected from the plurality of inspection sites in the image of the model displayed in the first display region. The control method further causes the processor to display inspection information prior to the first inspection information, as second inspection information relevant to the model, in a third display region, concurrently with one or more of the first display region and the second display region.

20 Claims, 8 Drawing Sheets

(56) References Cited

U.S. PATENT DOCUMENTS

| | | | | |
|---|---|---|---|---|
| 2014/0088819 A1* | 3/2014 | Easterly | ............ | G06Q 50/30 |
| | | | | 701/31.6 |
| 2014/0119514 A1* | 5/2014 | Miyazawa | ............ | G16H 40/63 |
| | | | | 378/98 |
| 2016/0109380 A1* | 4/2016 | Huibregtse | ............ | G06F 3/0412 |
| | | | | 356/240.1 |
| 2016/0179305 A1* | 6/2016 | Sato | ............ | G06F 3/0482 |
| | | | | 348/65 |
| 2018/0002010 A1* | 1/2018 | Bauer | ............ | B64C 39/024 |

FOREIGN PATENT DOCUMENTS

| | | |
|---|---|---|
| JP | 2009-207682 A | 9/2009 |
| JP | 2015-66236 A | 4/2015 |
| JP | 2016510462 A | 4/2016 |
| WO | 2014116372 A2 | 7/2014 |

\* cited by examiner

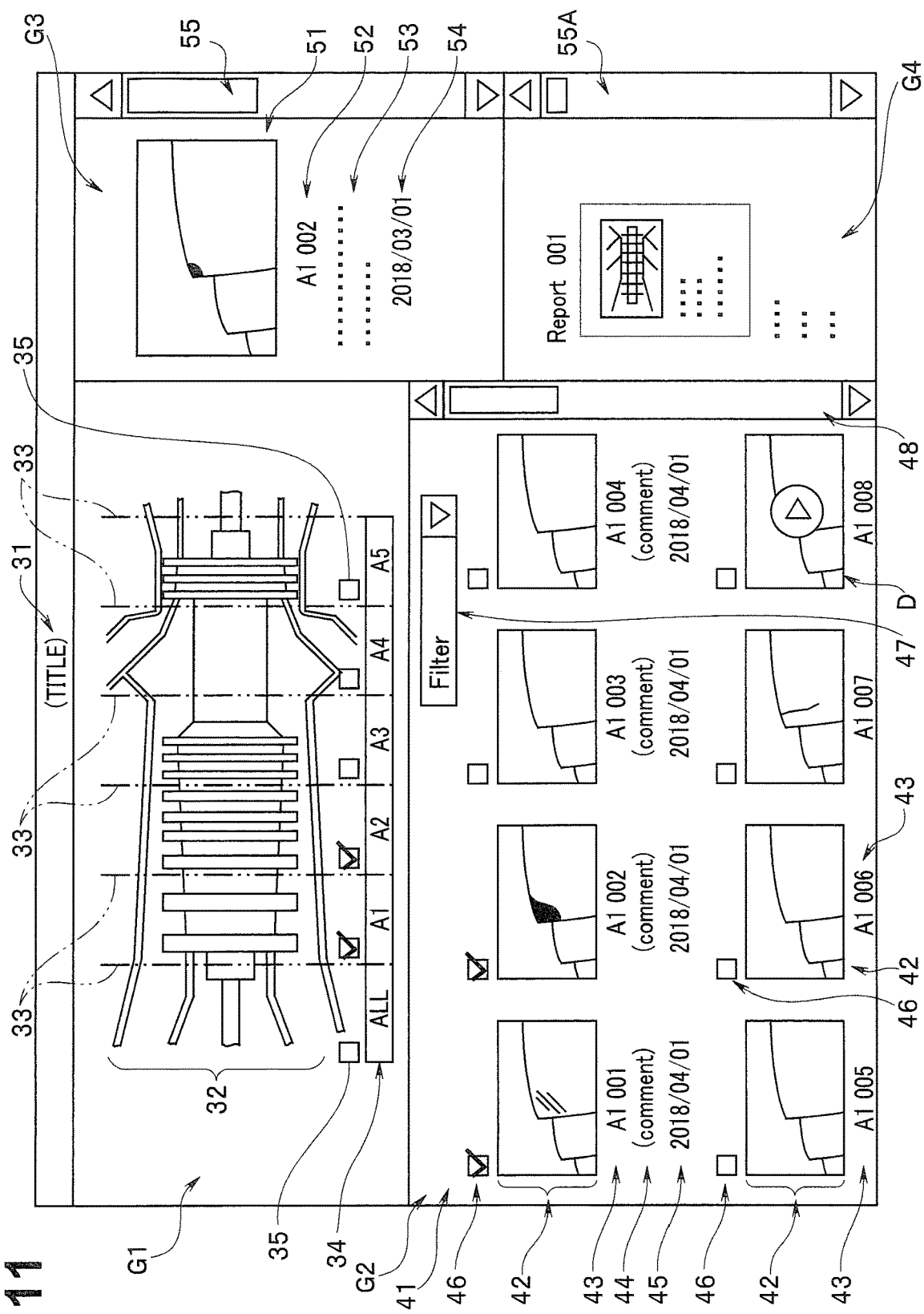

INSPECTION IMAGE DISPLAY CONTROL METHOD, INSPECTION IMAGE DISPLAY CONTROL APPARATUS AND INSPECTION IMAGE DISPLAY CONTROL SYSTEM

This application claims benefit of Japanese Application No. 2018-93036 filed in Japan on May 14, 2018, the contents of which are incorporated by this reference.

BACKGROUND OF THE INVENTION

1. Field of the Invention

The present invention relates to an inspection image display control method, an inspection image display control apparatus and an inspection image display control system.

2. Description of the Related Art

Conventionally, various apparatuses, various facilities and the like are inspected regularly or irregularly. Inspection data obtained by the inspection is evaluated and recorded by an inspector, and is used for repair necessity, failure prediction and the like about an inspection object.

The inspection object has a complex structure in some cases. For example, a turbine system of an electric power plant, an aircraft or the like has a complex structure, the inspection data includes image information, and data quantity of the inspection data is large.

For example, in International Publication No. 2014/116372, a system for efficiently managing the inspection data is proposed. In the system according to the proposition, for accessing object data from an enormous quantity of data, the inspection data is filtered in association with a model of the inspection object.

SUMMARY OF THE INVENTION

An inspection image display control method according to an aspect of the present invention causes a processor to display an image of a model of an inspection object including a plurality of inspection sites, in a first display region, display first inspection information relevant to at least one inspection site, in a second display region, the at least one inspection site being selected from the plurality of inspection sites in the image of the model, and display inspection information prior to the first inspection information, as second inspection information relevant to the model, in a third display region, concurrently with the first display region and the second display region.

An inspection image display control apparatus according to an aspect of the present invention is an inspection image display control apparatus including a processor, the processor being configured to cause a display apparatus to display an image of a model of an inspection object including a plurality of inspection sites, in a first display region, cause the display apparatus to display first inspection information relevant to at least one inspection site, in a second display region, the at least one inspection site being selected from the plurality of inspection sites in the image of the model, and cause the display apparatus to display inspection information prior to the first inspection information, as second inspection information relevant to the model, in a third display region, concurrently with the first display region and the second display region.

An inspection image display control system according to an aspect of the present invention is an inspection image display control system including a server and a terminal apparatus, the server including the inspection image display control apparatus according to the aspect, the terminal apparatus including the display apparatus, the server and the terminal apparatus being communicably connected through a network.

BRIEF DESCRIPTION OF THE DRAWINGS

FIG. 11 is a diagram showing a specific configuration example of an inspection data display screen that contains a fourth display region, according to the embodiment of the present invention.

DETAILED DESCRIPTION OF THE PREFERRED EMBODIMENT(S)

Hereinafter, an embodiment of the present invention will be described with reference to the drawings.
(Configuration)

Figure 1:
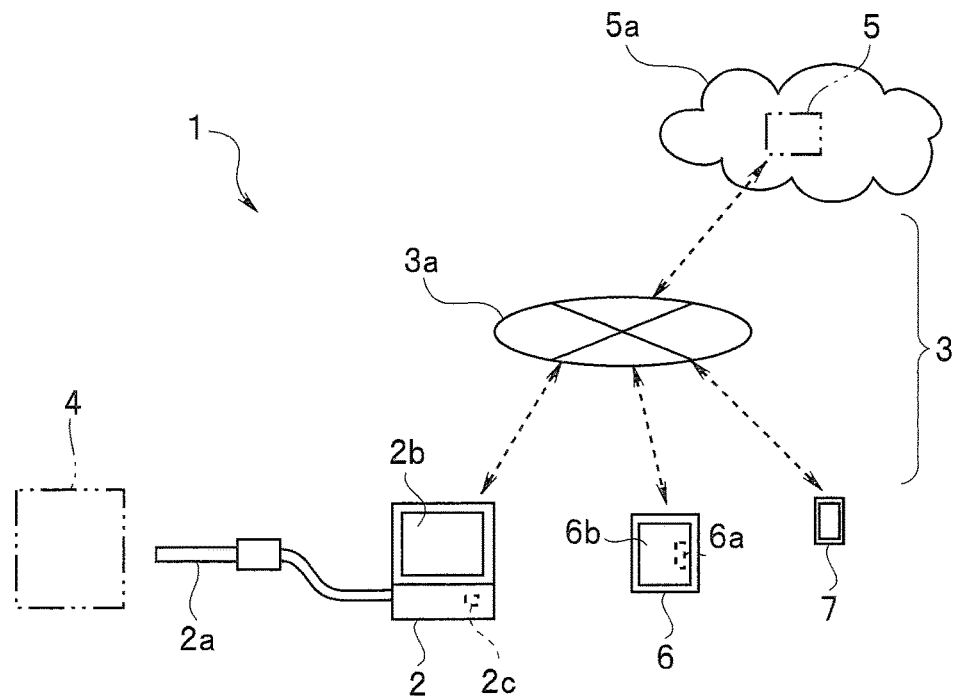
FIG. 1 is a configuration diagram of an inspection image display control system according to an embodiment of the present invention.

FIG. 1 is a configuration diagram of an inspection image display control system according to the embodiment. Hereinafter, the embodiment will be described using an example in which inspection data includes an endoscope image obtained by inspecting an inspection object with an endoscope apparatus.

An inspection image display control system 1 in the embodiment includes an endoscope apparatus 2, and a server 5 that is connected through a network 3. The network 3 includes an internet 3a.

The endoscope apparatus 2 includes an elongated insertion portion 2a, and can display an endoscope image on a monitor 2b. The endoscope image is acquired through an observation window provided at a distal end portion of the insertion portion 2a.

A user that is an inspector can perform inspection of an inspection object 4 by inserting the insertion portion 2a of the endoscope apparatus 2 into the inspection object 4 and watching the endoscope image of an interior of the inspection object 4.

Furthermore, the user can record the inspection data including the endoscope image, in a storage medium 2c such as a memory card. The storage medium 2c is detachable from the endoscope apparatus 2. The user can record both a still image and a moving image in the storage medium 2c, as the image of the interior of the inspection object.

The user can upload the inspection data obtained by the inspection, to a server 5 on a cloud 5a. When a communication function is provided in the endoscope apparatus 2, the user, using the communication function, can upload the inspection data recorded in the storage medium 2c from the endoscope apparatus 2 to the server 5.

Note that the user may upload the inspection data including the endoscope image, to the server 5, by attaching the storage medium 2c in which the inspection data is recorded to an unillustrated personal computer (hereinafter, referred to as a PC).

The inspection data includes a serial number of the inspection object, an inspection date, a plurality of endoscope images, and information relevant to the respective endoscope images, and is stored in a storage apparatus of the server 5, together with an inspection identifier (hereinafter, referred to as an inspection ID). The server 5 exists on the so-called cloud 5a, and the user such as the inspector can upload the inspection data to the server 5 on the cloud 5a, and can perform check and edit of the inspection data, creation of the inspection report, and the like.

Figure 2:
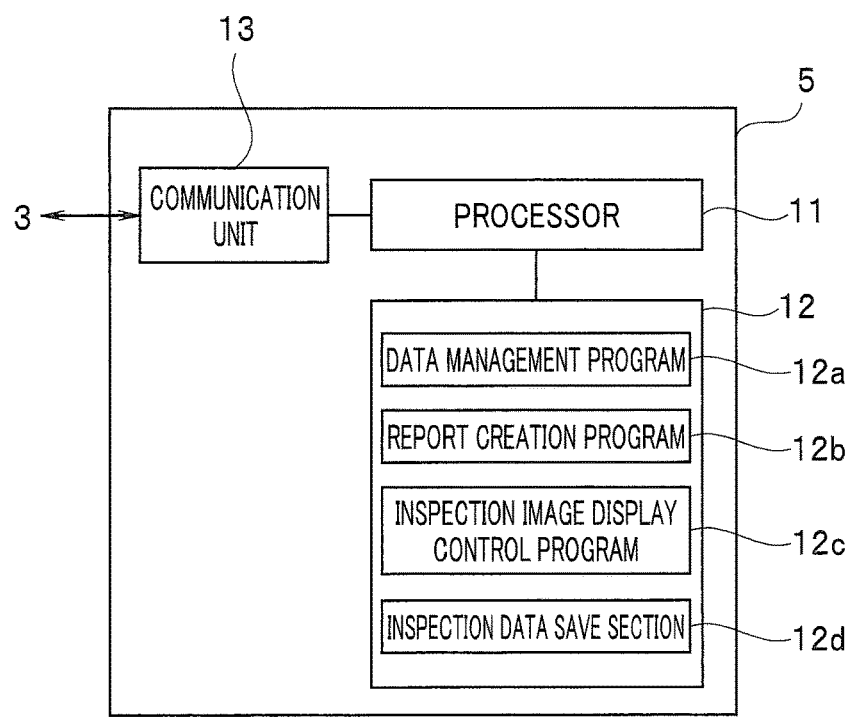
FIG. 2 is a block diagram showing a configuration of a server according to the embodiment of the present invention.

FIG. 2 is a block diagram showing a configuration of the server 5.

The server 5 includes a processor 11, a storage apparatus 12 and a communication unit 13. The processor 11 includes hardware circuits such as a central processing unit (hereinafter, referred to as a CPU), a ROM and a RAM.

Note that the processor 11 may include hardware such as a FPGA (field programmable gate array), instead of the CPU or separately from the CPU.

The storage apparatus 12 stores various software programs. Each software program is read and executed by the CPU of the processor 11.

Note that all or some of the various programs may be stored in the ROM of the processor 11.

In the storage apparatus 12, a data management program 12a, a report creation program 12b, an inspection image display control program 12c and the like are stored.

Furthermore, the storage apparatus 12 includes an inspection data save section 12d in which the inspection data is saved.

The data management program 12a is a software program configured to manage the uploaded inspection data.

The report creation program 12b is a software program configured to create the inspection report of the inspection data selected by the user.

The inspection image display control program 12c is a software program configured to generate a screen on which the inspection data is displayed. An inspection data display screen G described later is generated by the inspection image display control program 12c.

The inspection data save section 12d is a storage region in which the uploaded inspection data is stored and saved.

The communication unit 13 is a circuit with which the server 5 performs communication with external equipment through the network 3.

The inspection data stored in the inspection data save section 12d of the server 5 can be accessed by the external equipment through the communication unit 13, in a predetermined security environment. In the embodiment, the network 3 includes communication networks such as a LAN and WIFI, in addition to the internet 3a.

Back to FIG. 1, a tablet terminal 6 includes a processor 6a such as a CPU. Furthermore, the tablet terminal 6 includes a display device 6b and an unillustrated wireless communication circuit. Therefore, the processor 6a can execute a process corresponding to a command input by the user.

Note that a smartphone 7 also includes a processor and a display device similarly to the tablet terminal 6.

Accordingly, the data management program 12a of the server 5 reads the inspection data, in response to a data request command from external equipment such as the endoscope apparatus having the communication function, the tablet terminal 6, the smartphone 7 or the PC. The inspection image display control program 12c generates display data for the inspection data display screen G, using the read inspection data. The data management program 12a sends the display data to the external equipment that has sent the data request command.

That is, when the user wants to watch the inspection data registered on the cloud 5a, the user can access a data management screen on the cloud 5a from anywhere, and can watch the inspection data.

For example, the user accesses a predetermined data management screen on the cloud 5a, and causes the data management program 12a to display an inspection data list on a display apparatus of the external equipment such as the tablet terminal 6. In the inspection data list, plural pieces of inspection data are arrayed and displayed in a list form. Each piece of inspection data included in the inspection data list includes information such as the inspection ID, the inspection object, the serial number and an inspection day, by which the inspection data registered in the server 5 is specified.

When the user selects a piece of inspection data from the displayed inspection data list, a data request command for requesting the inspection data is sent to the server 5.

When the user designates a certain inspection ID in the inspection data list to send the data request command from a terminal apparatus such as the tablet terminal 6 to the server 5 on the cloud 5a, the data management program 12a reads the inspection data designated in the data request command and sends the inspection data to the external equipment.

The inspection data selected from the inspection data list, for example, is image information obtained in an inspection that is performed on a certain date and time for an inspection object specified by the serial number or the like.

As described above, the user can upload the inspection data obtained using the endoscope apparatus 2, to the server 5 on the cloud 5a, and can refer to the registered inspection data.

Further, using the external equipment, the user can edit the inspection data, and can create the inspection report of the inspection data.

Here, an example of a plurality of inspection sites in the inspection object will be described.

Figure 3:
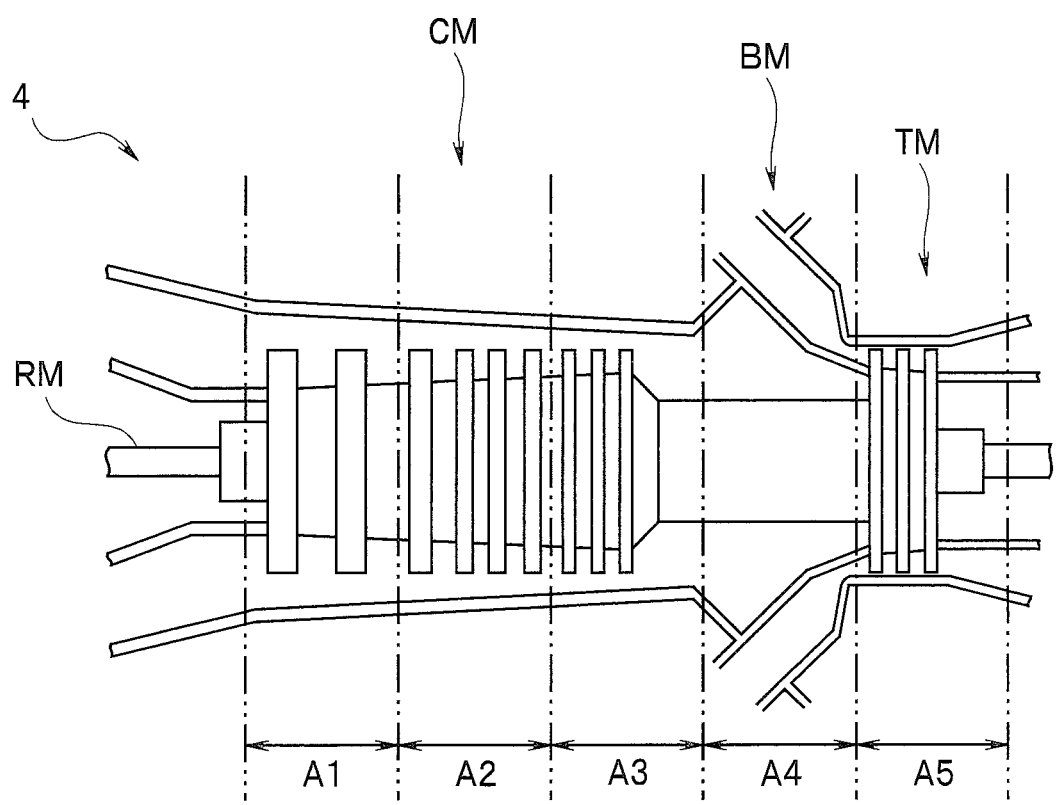
FIG. 3 is a diagram for describing inspection sites of an inspection object, according to the embodiment of the present invention.

FIG. 3 is a diagram for describing inspection sites of an inspection object. FIG. 3 shows a configuration of a gas turbine engine for electric power generation. The gas turbine engine as the inspection object 4 includes a compressor CM configured to compress intake air, a burning machine BM configured to inject fuel to a high-pressure gas from the compressor CM and burn the fuel, and a turbine TM configured to take out dynamic power of rotation of a rotating shaft RM using a high-temperature and high-pressure gas that has passed through the compressor CM and the burning machine BM.

Each inspection site is one inspection unit. In the embodiment, the compressor CM is divided into three inspection units, and each of the burning machine BM and the turbine TM becomes one inspection unit.

The user that is the inspector inserts the insertion portion 2a of the endoscope apparatus 2 into the gas turbine engine, and inspects each inspection site of the gas turbine engine. The user can record the endoscope image obtained during the inspection, in the storage medium 2c, as the inspection data.

The inspection data is stored in a folder for each inspection site of the inspection object. The inspection object includes the plurality of inspection sites, and the endoscope image is stored in a folder corresponding to an inspection site for which the endoscope image is photographed.

A plurality of folders is previously determined and set by the user or the like, for each inspection object. A configuration of the plurality of folders is previously determined by the user or the like, depending on a configuration or structure of the inspection object. The configuration or structure of the inspection object differs depending on a model, a model number and the like of the turbine engine that is the inspection object, and therefore, the user designates a plurality of folders corresponding to the inspection object to be inspected, and then performs the inspection.

During the inspection, the user designates the folder corresponding to the inspection site, and then performs the recording of the endoscope image. For example, when the user selects a command such as a recording button after the user selects the folder designating the inspection site, the user can record the endoscope image in the selected folder.

After the inspection of a certain inspection site finishes, the user designates the folder corresponding to a next inspection site, and then performs the inspection of the next inspection site. The endoscope image is stored in the designated folder.

Figure 4:
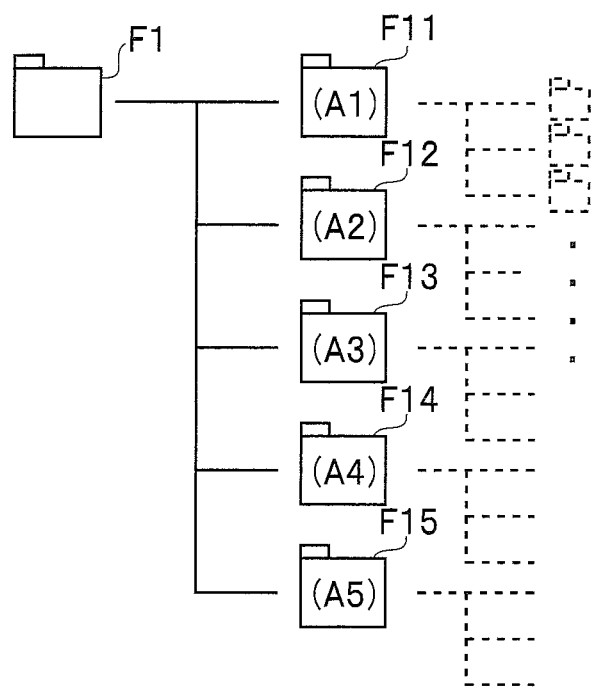
FIG. 4 is a diagram showing a folder tree structure of a plurality of folders in which inspection data is stored, according to the embodiment of the present invention.

FIG. 4 is a diagram showing a folder tree structure of the plurality of folders in which the inspection data is stored.

The folder configuration is determined depending on the configuration or structure of the inspection object. In the embodiment, one folder is provided for one inspection site, that is, one inspection unit. In the embodiment, five folders correspond to five inspection sites into which the gas turbine engine is previously divided. For example, before the inspection, the user downloads folder configuration information from the server 5, and stores the folder configuration information in the storage medium 2c.

Therefore, the folder configuration of storing the inspection data is created, for example, depending on the model number, model or serial number of the gas turbine engine. The plurality of folders having the folder configuration is stored in the storage medium 2c. Information about the plurality of folders having the folder configuration is acquired from an exterior, together with later-described image information about a model showing the configuration of the inspection object, and is previously stored in the storage medium 2c.

Here, for ease of description, an example in which the inspection units of the inspection object are respective inspection units A1 to A5 of the turbine engine shown in FIG. 3 will be described. The folder tree in FIG. 4 includes a folder F1 and five folders F11 to F15 provided at a lower hierarchy of the folder F1.

Note that the plurality of folders may further include one or more folders at lower hierarchies of the respective folders F11 to F15 as shown by doted lines in FIG. 4.

When each inspection site is one inspection unit, one or more endoscope images photographed in the inspection site are stored in one folder corresponding to the inspection site.

When the user inspects the inspection site A1 of the inspection object, the user previously selects or designates the folder F11 in the storage medium 2c, as a storage location for the inspection data. The inspection data of the endoscope image picked up by the user is stored in the selected or designated folder F11, after a predetermined file name described later is given.

When the user inspects the next inspection site A2 after the inspection of the inspection site A1 finishes, the user previously selects or designates the folder F12, as a storage location for the inspection data. Thereafter, the inspection data of the endoscope image picked up by the user is stored in the selected or designated folder F12, after a predetermined file name is given.

Subsequently, similarly, the user previously selects or designates the storage location for the inspection data, and then acquires the endoscope image, so that the inspection data of the acquired endoscope image is stored in the selected or designated folder.

The user watches the endoscope image displayed on the monitor of the endoscope apparatus 2, gives evaluation information, and records the endoscope image.

For example, when some kind of defect is found in a certain inspection site within the inspection object, the user can freeze the endoscope image of the inspection site to photograph the still image, and can record information of an inspection evaluation result about the inspection site, in association with the endoscope image.

Examples of states of the inspection site include a variety of states such as a state where replacement of a component is needed, a state where fixing of a component is needed, a state where repair is not needed but check is needed at a next inspection, and a state of no problem. When the user records the endoscope image, the user can store evaluation information about the state of the inspection site in the storage medium 2c, such that the evaluation information is associated with the inspection data of the endoscope image or such that the evaluation information is included in the inspection data.

For example, as described in Japanese Patent Application Laid-Open Publication No. 2015-66236, the evaluation information may be included in the file name of the inspection data.

Figure 5:
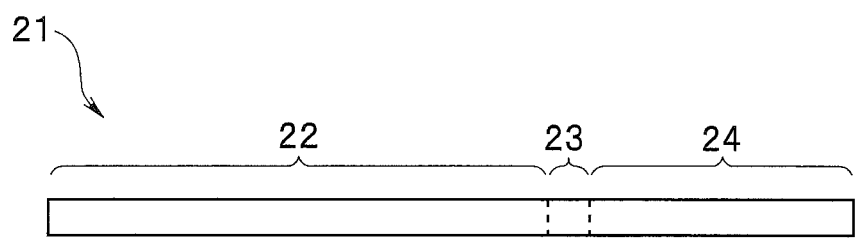
FIG. 5 is a diagram showing a configuration example of a file name that includes evaluation information, according to the embodiment of the present invention.

FIG. 5 is a diagram showing a configuration example of a file name that includes the evaluation information.

A file name 21 includes folder information 22 in which the inspection data is stored, a file mark 23 as the evaluation information, and a portion 24 showing a sequential number.

The folder information 22 includes a folder name in the folder structure shown in FIG. 4. When the folder tree structure has two or more hierarchies as shown by the dotted lines in FIG. 4, the folder information 22 includes folder names of a plurality of hierarchies for specifying the folder in which the image data is stored.

The file mark 23 indicates the inspection evaluation result. The file mark 23 is inspection result information that is configured by a character indicating an inspection result. The inspection result information is information about a judgement result that the user judges in an endoscope inspection. For example, when the file mark 23 in the file name is "A", the file name means that the user has judged that the portion of the inspection site seen on the endoscope image is "no problem". When the file mark 23 in the file name is "B", the file name means that the user has judged that the portion of the inspection site seen on the endoscope image is "replacement needed", which indicates that the replacement of the component is needed. When the file mark 23 in the file name is "C", the file name means that the user has judged that the portion of the inspection site seen on the endoscope image is "fixing needed". When the file mark 23 in the file name is "D", the file name means that the user has judged that the portion of the inspection site seen on the endoscope image is "re-inspection needed".

For example, the user inputs the file mark 23 when the user records the inspection data of the endoscope image, so that the file mark 23 is written.

The sequential number is identification information. When the endoscope image is recorded in the folder for the first time, the portion 24 showing the sequential number shows "001". Thereafter, whenever the endoscope image is added, the sequential number is incremented by "1".

Furthermore, a portion for an extension such as "jpg", which is a character string for identifying the type of the file, is added to the file name.

Further, when the user records the inspection data, the user can add a comment. The user can cause an unillustrated comment input window to be displayed, can input an arbitrary comment as text data, and can store the comment in association with the inspection data.

Therefore, when the user inspects the inspection object, the user stores folders having a folder tree structure set depending on the inspection object, in the storage medium 2c, and then starts the inspection. The user observes the respective inspection sites of the inspection object, picks up a necessary inspection site during the observation, and records the endoscope image in the storage medium 2c. When the user records each endoscope image, the user selects the file mark as the evaluation information, in the embodiment. In this way, the endoscope image for each site is recorded in the storage medium 2c, as the inspection data.

When the inspection finishes, the inspection data has been stored in the storage medium 2c of the endoscope apparatus 2. After the inspection, the user uploads the inspection data to the server 5 on the cloud 5a. As described above, the upload is performed, for example, by sending the inspection data from the endoscope apparatus 2 or the tablet terminal 6 to the server 5 through the network 3.

Since the inspection of the inspection object is performed using identification information such as the serial number of the inspection object, inspection identification information, that is, the inspection ID is specified, and the inspection data is uploaded to the server 5, so that the inspection data is registered in the server 5 so as to be linked with the inspection object.

As described above, the uploaded inspection data is data stored in a plurality of folders in a folder tree that is previously set depending on the configuration of the inspection object 4. The inspection data includes one or more endoscope images for each inspection site and the file mark for the inspection site in each endoscope image.

Further, as described later, the user can create the inspection report using the inspection data on the cloud 5a. Then, together with the inspection data, the created inspection report is saved in the server 5, in association with the inspection data.

As described above, plural pieces of inspection data for the inspection object are stored on the cloud 5a, and each piece of inspection data is stored in accordance with a previously determined folder configuration.

(Operation)

The user can perform various processes, to the inspection data accumulated in the server 5 on the cloud 5a. For example, the user performs processes such as the check of the inspection data uploaded in the server 5 and the creation of the inspection report.

Figure 6:
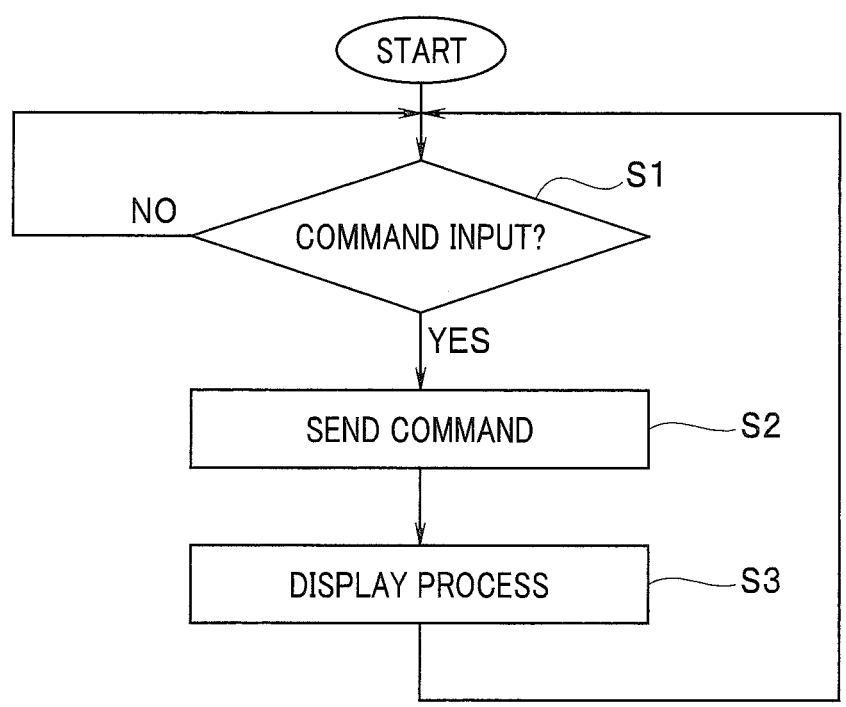
FIG. 6 is a flowchart showing an example of a flow of a process in a terminal apparatus that is used by a user, according to the embodiment of the present invention.

FIG. 6 is a flowchart showing an example of a flow of a process in the terminal apparatus that is used by the user.

First, the user operates the terminal apparatus such as the endoscope apparatus 2, the tablet terminal 6 or the smartphone 7, and accesses an inspection data management site on the cloud 5a. The inspection data management site is provided in the server 5. A case where the terminal apparatus is the tablet terminal 6 will be described below.

The user accesses a predetermined site, and thereby a menu screen is displayed on a screen of the tablet terminal 6. The user can watch or edit desired inspection data by inputting a desired command from the menu screen.

FIG. 6 is a flowchart showing an example of a flow of a process in the tablet terminal 6 when the user inputs various commands such as the data request command. When the user accesses a predetermined site in the server 5 from the tablet terminal 6, a graphical user interface (hereinafter, referred to as GUI) screen such as a menu screen is displayed on the display device 6b. The process in FIG. 6 is executed by an operation on the menu screen by the user.

In FIG. 6, the processor 6a of the tablet terminal 6 judges whether a command for the inspection data has been inputted (step (hereinafter, abbreviated to S) 1). The display device 6b includes a touch panel apparatus, and through the GUI screen displayed on the display device 6b, the user can input various commands on the GUI screen.

When the command for the inspection data has not been inputted (S1: NO), the processor 6a does not perform anything.

When the command for the inspection data has been inputted (S1: YES), the processor 6a sends the inputted command to the server 5 (S2).

For example, the user selects an object in the inspection data list displayed on the screen, and touches an operation button of a GUI component displayed on the menu screen, so that the data request command is sent to the server 5. The inspection request command includes the inspection ID and the like. The server 5 extracts the designated inspection data based on the data request command, and sends the image data including the inspection data, to the tablet terminal 6.

After the sending of the command, the processor 6a receives the image data corresponding to the command, and executes a display process of displaying the image data on the display device 6b (S3).

After S3, back to the process of S1, the processes of S1 to S3 are repeated, and thereby the user can perform a desired process.

Figure 7:
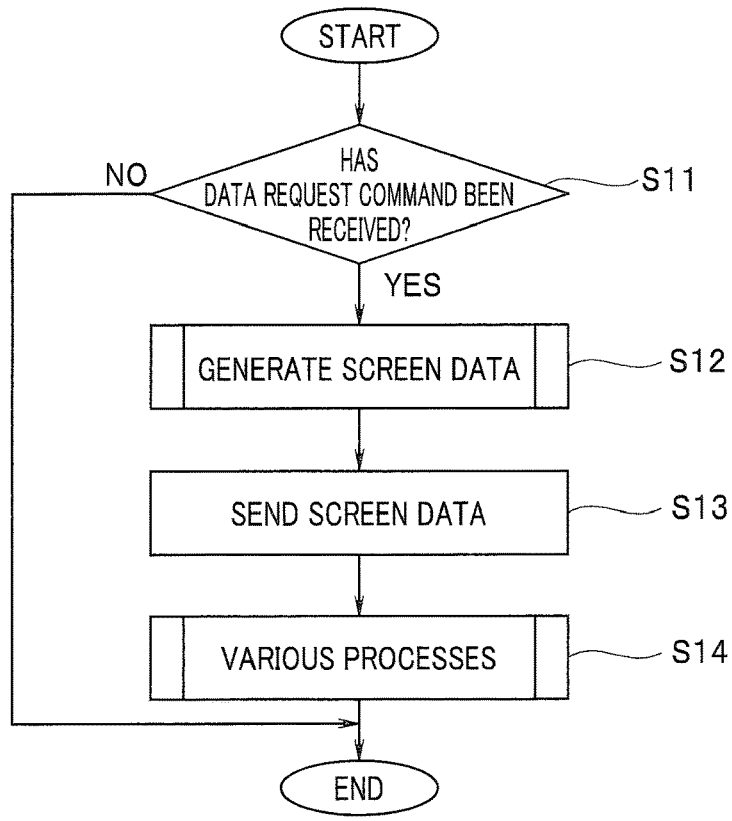
FIG. 7 is a flowchart showing an example of a flow of a process in a server corresponding to a data request command for the inspection data from a tablet terminal, according to the embodiment of the present invention.

FIG. 7 is a flowchart showing an example of a flow of a process in the server 5 corresponding to the data request command for the inspection data from the tablet terminal 6.

As described above, from the tablet terminal 6, the user designates the inspection ID, and sends the data request command for the inspection data. The model number of the gas turbine engine as the inspection object, the serial number, the inspection day and the like are specified by the inspection ID.

The server 5 judges whether the data request command for the inspection data has been received (S11). When the data request command for the inspection data has not been received (S11: NO), the server 5 does not perform any process.

When the data request command for the inspection data has been received (S11: YES), the server 5 executes a generation process for the screen data (S12). The server 5 reads the inspection data related to the data request command, from the inspection data save section 12d of the storage apparatus 12, and generates the screen data (S2). A configuration of a screen to be generated in S12 will be described later.

The server 5 sends the screen data for the generated screen, to the tablet terminal 6 (S13). The screen data is image data by which a screen having a later-described screen configuration is displayed on the display device 6b of the tablet terminal 6. As a result, a screen with a predetermined configuration is displayed on the display device 6b of the tablet terminal 6.

The screen displayed on the tablet terminal 6 is a GUI screen as described later, and the user can send desired commands to the server 5 and can request further process executions to the server 5, by operating various operation buttons and the like on the GUI screen.

Note that the server 5 ends the process about the screen displayed on the display device 6b when the user operates a predetermined end button.

Figure 8:
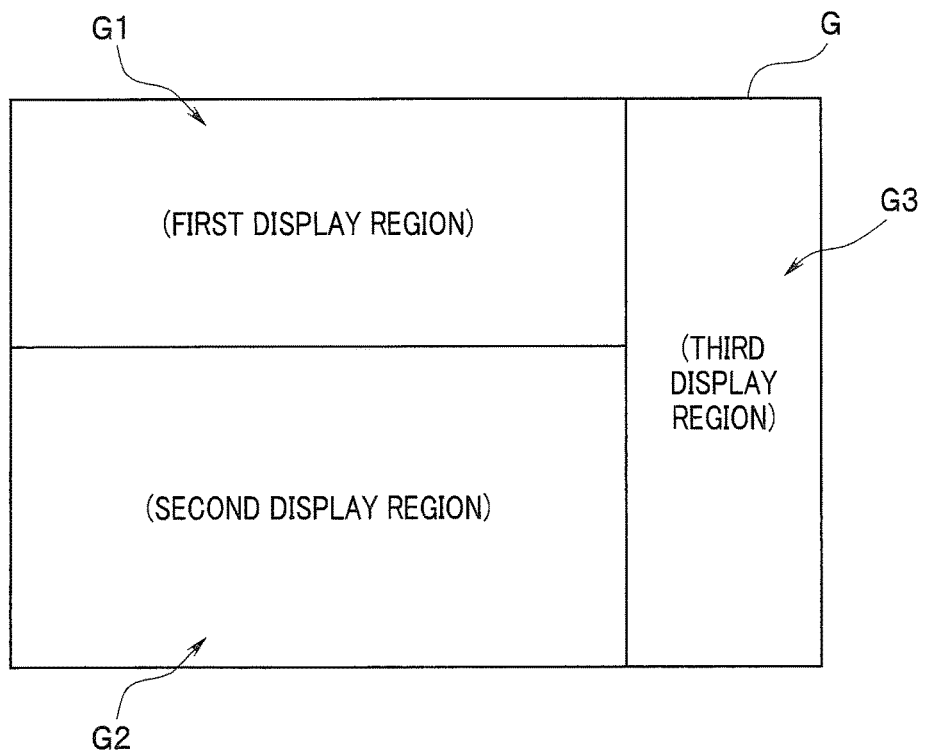
FIG. 8 is a diagram showing a configuration of an inspection data display screen that is displayed on the tablet terminal based on image data received from the server, according to the embodiment of the present invention.

The screen displayed on the display apparatus of the terminal apparatus is a screen generated in the server 5, and has a configuration shown in FIG. 8.

FIG. 8 is a diagram showing a configuration of an inspection data display screen that is displayed on the tablet terminal 6 based on the image data received from the server 5.

In the embodiment, an inspection data display screen G includes three display regions G1, G2, G3.

In the first display region G1, an image showing the configuration of the inspection object (hereinafter, referred to as an image of the model) is displayed.

In the second display region G2, the inspection data for at least one inspection site selected in the first display region G1 is displayed. The inspection data includes the endoscope image that is an inspection image.

In the third display region G3, the inspection data relevant to the inspection object displayed on the first display region G1 is displayed. The inspection data displayed in the third display region G3 is the inspection data prior to the inspection data displayed in the second display region G2. The prior inspection information is also stored in the server 5. The inspection data in the third display region G3 is displayed together with the first display region G1 and the second display region G2.

As described later, the inspection data display screen G is a GUI allowing the user to input various commands in addition to presentation of information. Therefore, the user can send desired various commands to the server 5, by selecting operation buttons, checkboxes and the like on the inspection data display screen G. A specific example of the inspection data display screen G will be described later.

In the embodiment, in the inspection data display screen G, the second display region G2 is arranged under the first display region G1, and the third display region G3 is arranged on a right side of the first display region G1 and the second display region G2. Note that the three display regions may be arranged at positions other than the arrangement shown in FIG. 8.

Back to FIG. 7, the server 5, after S13, executes various processes corresponding to various commands sent through the inspection data display screen G that is a GUI (S14).

The various processes in S14 include filtering for narrowing the display data, the creation of the inspection report using the selected inspection data, the edit of the inspection data, and the like. The creation of the inspection report is performed by the report creation program 12b. Therefore, for example, the user can create the inspection report, can register the created inspection report in the server 5, and can register the inspection data after the edit in the server 5. In the server 5, the created inspection report is stored in the inspection data save section 12d of the storage apparatus 12, in association with the inspection data related to the data request command. In the server 5, the inspection data related to the data request command is changed to the inspection data after the edit.

Figure 9:
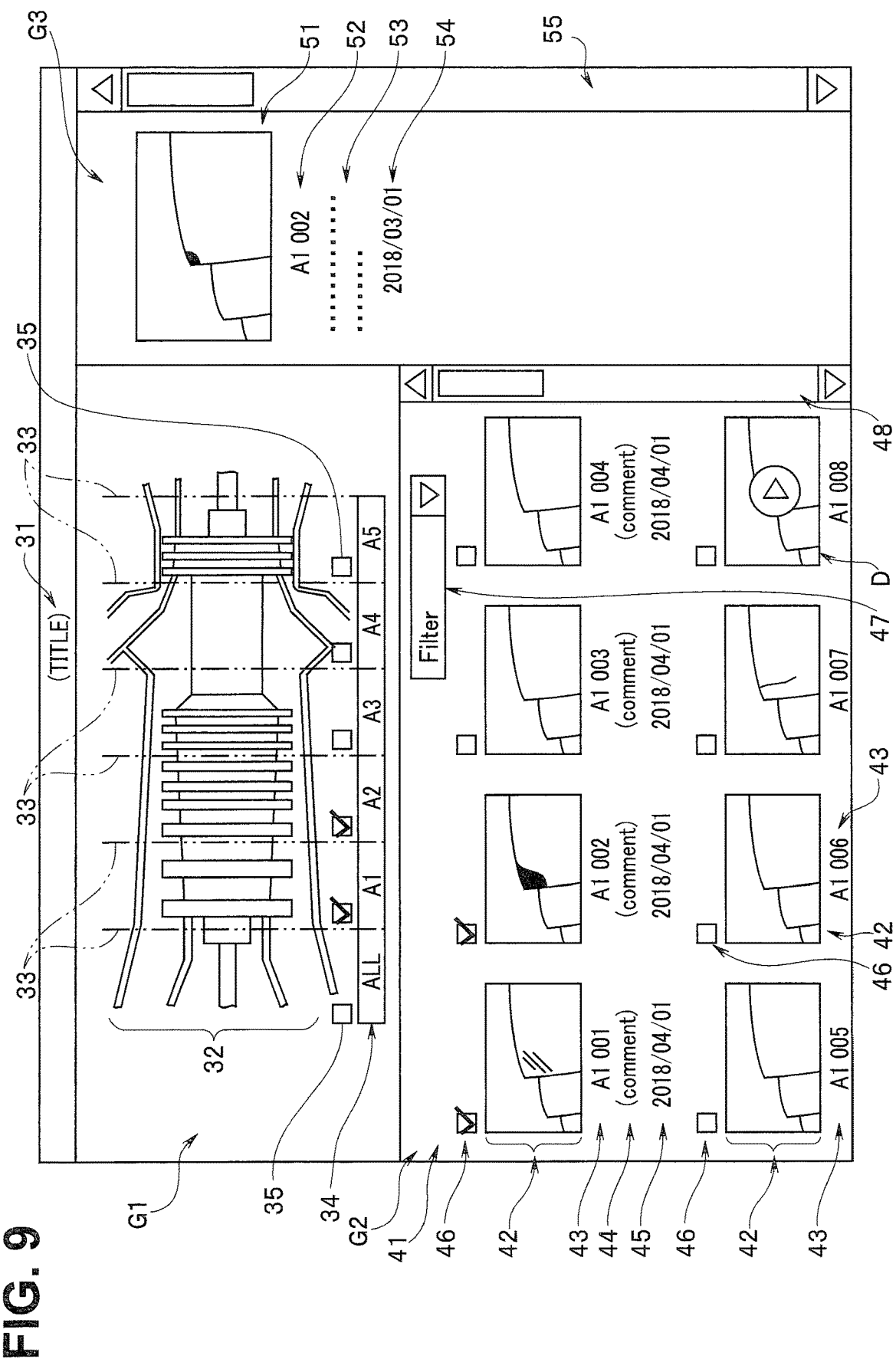
FIG. 9 is a diagram showing a specific configuration example of the inspection data display screen, according to the embodiment of the present invention.

FIG. 9 is a diagram showing a specific configuration example of the inspection data display screen G.

The inspection data display screen G includes a title display portion 31 configured to display an inspection object name, at an upper portion. In the title display portion 31, information such as the model number, serial number and inspection ID of the inspection object for the inspection data to be displayed on the inspection data display screen G is displayed.

The first display region G1 includes a model image display portion 32 configured to display an image of the model showing the configuration of the inspection object. The image of the model is an external view, a sectional view or the like showing the configuration of the inspection object. In FIG. 9, a schematic sectional view of the gas turbine engine is displayed as the image of the model, in the model image display portion 32.

Note that the image of the model to be displayed in the model image display portion 32 may be a schematic diagram as shown in FIG. 9 but may be a figure generated by a photograph or a 3D model, a CAD figure or the like.

Furthermore, the first display region G1 includes region specifying portions 33 configured to indicate ranges of the respective inspection sites of the inspection object. In FIG. 9, the region specifying portions 33 are a plurality of two-dot chain lines. In the embodiment, one inspection site is a region that is marked off by two two-dot chain lines.

Further, the first display region G1 includes a region name display portion 34 configured to display region names of the respective inspection sites. In the embodiment, the region name display portion 34 includes region names of the five inspection sites A1 to A5. "A1" to "A5" are displayed so as to correspond to the five inspection sites A1 to A5 specified by the region specifying portions 33.

Note that the region name display portion 34 also includes a display "ALL" indicating selection of all regions.

Furthermore, the first display region G1 includes a plurality of checkboxes 35 for selecting the respective inspection sites. In the embodiment, six checkboxes 35 are provided so as to correspond to the five inspection sites A1 to A5 and "ALL" indicating all regions. The respective checkboxes 35 are arranged close to the respective region names in the region name display portion 34.

The user can put check marks on one or more checkboxes 35 displayed on the display device 6b, by touching the checkboxes 35. By putting the check marks, the user can select the inspection sites corresponding to the checkboxes 35 on which the check marks are put.

The second display region G2 includes an inspection data display region 41 configured to display one or more pieces of inspection data. The inspection data to be displayed in the second display region G2 is the inspection data that is designated in the data request command by the user.

Each piece of inspection data to be displayed in the inspection data display region 41 includes an image display region 42, a file name display portion 43, a comment display portion 44 and a date display portion 45.

Note that the inspection data indicated by an arrow D in FIG. 9 is moving image data.

In the image display region 42, a reduced endoscope image in the inspection data is displayed.

In the file name display portion 43, a whole or a part of the file name of the endoscope image displayed in the image display region 42 is displayed.

In the comment display portion 44, if a comment is inputted by the user, a whole or a part of the comment is displayed.

In the date display portion 45, a date when the endoscope image displayed in the image display region 42 was photographed is displayed. That is, the inspection day of the inspection object is displayed.

Furthermore, checkboxes 46 are added to the respective inspection data. In FIG. 9, the respective checkboxes 46 are provided so as to be close to or adjacent to the image display regions 42.

The user can put check marks on the checkboxes 46 displayed on the display device 6b, by touching the checkboxes 46. By putting the check marks, the user can select the inspection data corresponding to the checkboxes 46 on which the check marks are put.

Furthermore, in the second display region G2, a command designation portion 47 is provided. The command designation portion 47 is a combo box, and the user can cause a plurality of commands to be displayed and can select a desired command from the plurality of commands by performing drop-down using a cursor.

Further, in the second display region G2, a scroll bar 48 is provided, and the user can change a display position in the second display region G2, using the scroll bar 48.

For example, when the user selects an inspection site in the image of the model displayed in the first display region G1, the inspection data for the inspection site selected in the first display region G1 is displayed in the second display region G2.

In FIG. 9, in the first display region G1, two regions are selected from the five inspection sites, and thereby in the second display region G2, the inspection data for the two inspection sites selected in the first display region G1 is displayed.

When the user wants to cause the inspection data for another inspection site to be displayed, the user selects the other inspection site from the five inspection sites, and thereby can cause the inspection data for the other inspection site to be displayed in the second display region G2.

When the user wants to cause the inspection data for all inspection sites to be displayed, the user puts a check on the checkbox corresponding to "ALL", and thereby the user can cause the inspection data for all inspection sites to be displayed in the second display region G2.

As described above, first inspection information to be displayed in the second display region G2 includes an image relevant to at least one inspection site that is selected in the first display region G1.

Note that when no inspection site is selected in the first display region G1, all pieces of the inspection data about the inspection object, for example, are displayed in a file name order in the second display region G2 as a default. That is, when the inspection data display screen G is displayed for the first time or when no inspection site is selected, information that is set as the default and that is narrowed in a predetermined condition is displayed as the first inspection information, in the second display region G2.

For example, the predetermined condition is specified by the evaluation information (A, B, C, D) such as the file mark added to the inspection data, which is included in the first inspection information to be displayed in the second display region G2. Alternatively, the predetermined condition is specified by date information of the inspection data, which is included in the first inspection information to be displayed in the second display region G2.

The user can perform a desired process, to the inspection data displayed in the second display region G2. An instruction of execution of the desired process can be given by selecting a desired command in the command designation portion 47.

For example, when the user selects a command for report creation as the desired command, the user can send, to the server 5, a creation instruction command for an inspection report about one or more pieces of inspection data selected with the checkboxes 46 in the second display region G2. Alternatively, when the command for report creation is selected, an inspection report about one or more inspection sites that are selected from the plurality of inspection sites displayed in the first display region G1 is created by the report creation program 12b.

That is, the processor creates the inspection report, based on the inspection information for one or more inspection sites that are selected from the plurality of inspection sites displayed in the first display region G1 or one or more pieces of inspection information that are selected from the first inspection information displayed in the second display region G2.

As a result, the server 5 creates the inspection report using a predetermined template, and stores the inspection report in the storage apparatus 12d. The user can separately refer to the stored report from the tablet terminal 6.

As described above, the inspection data relevant to the model displayed in the first display region G1 and prior to the inspection data displayed in the second display region G2 is displayed in the third display region G3.

In FIG. 9, two inspection sites A1, A2 are selected in the first display region G1, and therefore, the prior inspection data relevant to the two inspection sites is displayed in the third display region G3.

In the third display region G3, all of the prior inspection data relevant to the model displayed in the first display region G1 may be displayed, but in the embodiment, only the prior inspection data selected based on the evaluation information with the file mark is displayed.

For example, when pieces of inspection data on a plurality of prior dates are stored in the inspection data save section 12d as the inspection data relevant to the two selected inspection sites, a piece of inspection data having a lowest evaluation and a latest inspection date is selected from the prior data pieces, and is displayed in the third display region G3.

The inspection data to be displayed in the third display region G3 includes an image display region 51, a file name display portion 52, a comment display portion 53 and a date display portion 54, similarly to the inspection data in the second display region G2.

Further, in the third display region G3, a scroll bar 55 is provided, and the user can change a display position in the third display region G3, using the scroll bar 55.

Figure 10:
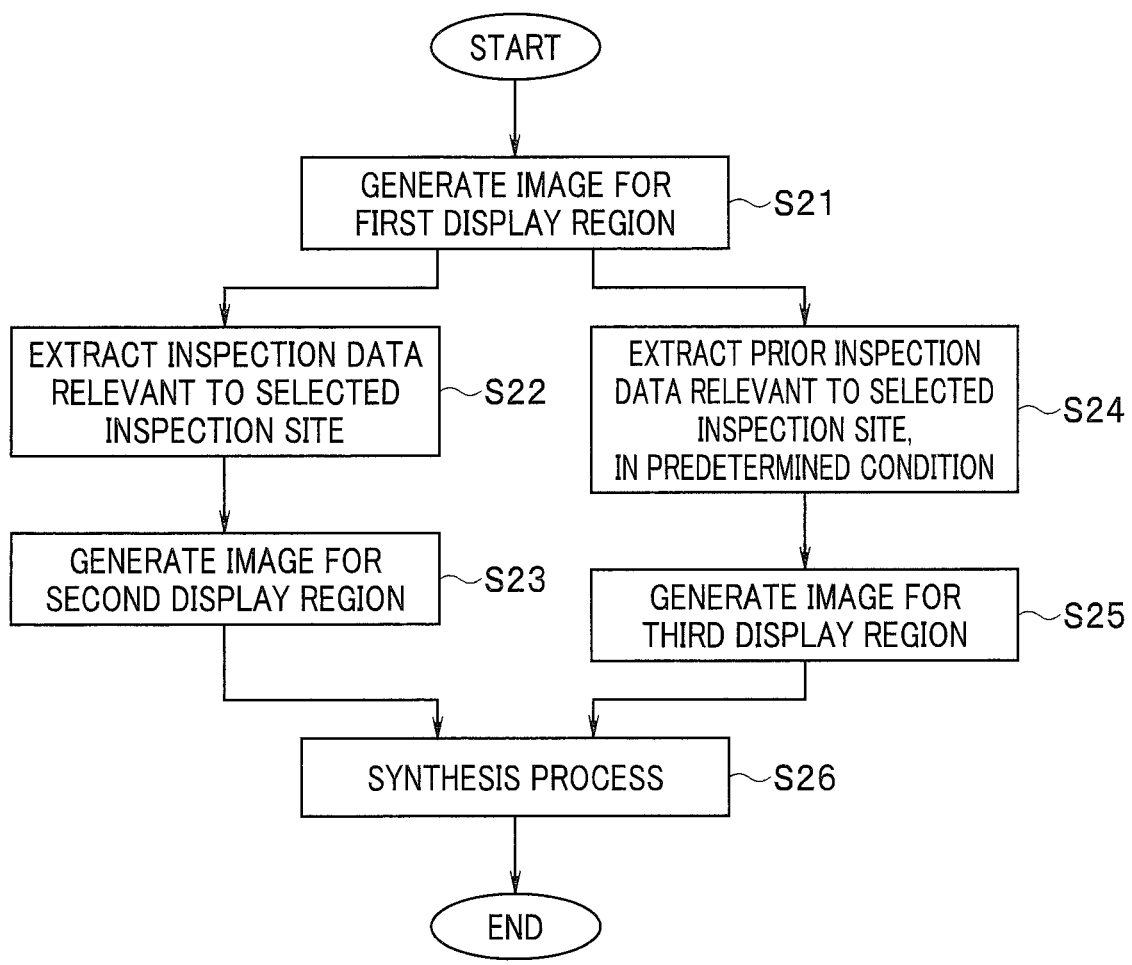
FIG. 10 is a flowchart showing an example of a flow of a generation process for image data in FIG. 7, according to the embodiment of the present invention.

FIG. 10 is a flowchart showing an example of a flow of the generation process (S12) for the image data in FIG. 7.

When the server 5 receives the data request command for the inspection data, the server 5 generates the image for the first display region G1 (S21). In S21, the server 5 generates an image that is relevant to the inspection data specified by the data request command and that is shown in the first display region G1 shown in FIG. 9.

The image to be shown in the first display region G1 includes the model image display portion 32, the region specifying portion 33, the region name display portion 34 and the plurality of checkboxes 35. Particularly, in the model image display portion 32, the image of the model of the inspection object is displayed.

That is, in the process of S21, the image of the model of the inspection object including a plurality of inspection sites is displayed in the first display region G1 on the display device 6b of the tablet terminal 6.

The server 5 extracts the inspection data about the inspection site selected with the checkbox 35 in the first display region G1 (S22). The server 5 extracts the inspection data about the selected inspection site, from the inspection data stored in the inspection data save section 12d.

After S22, the server 5 generates the image for the second display region shown in FIG. 9, using the extracted inspection data (S23).

That is, in the process of S23, the first inspection information relevant to at least one inspection site that is selected from the plurality of inspection sites in the image of the model displayed in the first display region G1 is displayed in the second display region G2 on the display device 6b of the tablet terminal 6.

Further, after S21, the server 5 extracts the prior inspection data about the inspection site selected with the checkbox 35 in the first display region G1, in a predetermined condition (S24). The server 5 extracts the inspection data about the inspection site selected with the checkbox 35, from the prior inspection data for the inspection object that is stored in the inspection data save section 12d, in a predetermined condition.

The extraction condition in S24 is previously set, and the setting can be changed by the user. For example, the extraction condition is the extraction of the inspection data having the lowest evaluation and the latest inspection date in the prior data as described above.

Note that the server 5, in S24, may extract the prior inspection data about the inspection data selected with the checkbox 46 in the second display region G2, in a predetermined condition.

For example, when each piece of inspection data includes positional information in the inspection site, the extraction condition is the extraction of the inspection data for a position close to a position of the inspection data selected with the checkbox 46 in the second display region G2.

That is, second inspection information to be displayed in the third display region G3 may include an image of a portion close to a portion of the inspection object seen on an image that is included in the inspection information selected in the second display region G2.

As a result, the user can watch the prior inspection data for a vicinity of a position where the image of the selected inspection data was photographed.

After S24, the server 5 generates the image for the third display region G3 shown in FIG. 9, using the extracted prior inspection data (S25).

That is, in the process of S25, the inspection information prior to the first inspection information is displayed as the second inspection information relevant to the model of the inspection object, in the third display region G3 on the display device 6b of the tablet terminal 6.

After S23 and S25, the server 5 generates the inspection data display screen G shown in FIG. 9, by synthesizing the images for the three display regions generated in S21, S23 and S25 (S26).

By S26, the inspection data display screen G shown in FIG. 9 is generated, and is sent to the tablet terminal 6. On the tablet terminal 6, the inspection data display screen G shown in FIG. 9 is displayed. That is, in the process of S26, the inspection information prior to the first inspection information is displayed in the third display region G3, concurrently with the first display region G1 and the second display region G2.

In FIG. 9, the second inspection information to be displayed in the third display region G3 includes the image relevant to at least one inspection site that is selected in the first display region G1.

In the case of FIG. 9, when pieces of inspection data at a plurality of prior time points are stored in the inspection data save section 12d as the inspection data relevant to the two inspection sites A1, A2, a piece of inspection data having the latest date is selected from pieces of inspection data having the lowest evaluation in the prior data pieces, and is displayed in the third display region G3.

That is, the second inspection information to be displayed in the third display region G3 includes an image that is a latest image in the prior inspection information and to which an evaluation equal to or lower than a predetermined level is given in predetermined evaluation information.

Since the piece of inspection data having the latest date and the lowest evaluation in the prior data pieces is displayed in the third display region G3, the user, in the inspection, can perceive an inspection site to which most attention should be paid, can surely inspect a spot in question, and can properly perform the evaluation. Particularly, since the evaluation information is included in the inspection data, the user can perform the evaluation in the inspection, by reference to last evaluation information, and can perform a feedback for a last evaluation.

Note that the second inspection information to be displayed in the third display region G3 may include an image that is selected from the prior inspection information based only on predetermined evaluation information such as the file mark. Particularly, the third inspection information may include only an image to which an evaluation equal to or lower than a predetermined level in evaluation results indicated by the file mark is given.

Furthermore, note that the second inspection information may include an image containing a defect region that has been judged and recorded as a defect in the first display region G1. Whether the image contains the defect region can be judged, for example, by the file mark.

Further, the second inspection information to be displayed in the third display region G3 may be the latest image in the prior inspection information.

Furthermore, the second inspection information to be displayed in the third display region G3 may be an image that is extracted from the inspection report relevant to the inspection object in a predetermined condition. For example, when a plurality of inspection reports exists, an image of inspection data having a worst evaluation result in a latest inspection report may be displayed in the third display region G3.

Note that the inspection data display screen G may contain a fourth display region G4 in which a prior inspection report is displayed.

FIG. 11 is a diagram showing a specific configuration example of the inspection data display screen G that contains the fourth display region G4.

The inspection data display screen G shown in FIG. 11 has the fourth display region G4 at a lower right portion of the inspection data display screen G.

In the fourth display region G4, a content of the prior inspection report itself or an image in the inspection report that is extracted in a predetermined condition is displayed. In the fourth display region G4, a scroll bar 55A is provided, and the user can change a display position in the fourth display region G4, using the scroll bar 55A.

For example, in the case of FIG. 11, when a plurality of inspection reports at a plurality of prior time points is stored in the inspection data save section 12d as inspection reports relevant to the two inspection sites A1, A2, an inspection report having the latest date is selected from the prior inspection reports, and is displayed in the fourth display region G4.

That is, the user may cause the processor of the server 5 to display an image extracted from the inspection report relevant to the inspection object, in the fourth display region G4.

Since the user can watch the prior inspection reports as necessary, the user can evaluate the inspection of the inspection object that the user is currently inspecting, while comparing inspection results in the prior inspection reports.

Note that the fourth display region G4 may be arranged at a position away from the third display region G3 or may be arranged within the third display region G3 although the fourth display region G4 is arranged so as to be adjacent to the third display region G3 in FIG. 11.

Furthermore, note that only link information for referring to the prior inspection report may be displayed in the fourth display region G4 although the content of the prior inspection report is displayed in the fourth display region G4 in FIG. 11.

For example, when the user touches and selects a link information portion, the image extracted from the prior inspection report in a predetermined condition is displayed in a pop-up window or the like. That is, the image extracted from the inspection report may be displayed when the link information displayed in the third display region G3 is selected.

As described above, according to the above-described embodiment, it is possible to provide an inspection image display control method, an inspection image display control apparatus and an inspection image display control system that allow the user to easily refer to the prior inspection information relevant to a certain inspection when the information about the certain inspection is displayed.

As a result, the user can perform the evaluation of the inspection while watching the inspection data with a prior problem, and therefore can reduce variation in the evaluation of the inspection data.

Further, when the inspection data having a low evaluation in the prior inspection is displayed in the third display region G3, it is possible to prevent the user from missing the inspection data with the prior problem.

Furthermore, the above-described embodiment is convenient because the inspection data is stored in the server 5 on the cloud 5a and the user can perform various processes such as data edit and report creation on the cloud 5a.

In the above-described embodiment, the server 5, which executes the process in FIG. 10, configures the inspection image display apparatus that causes the display device of the external equipment to display the inspection data display screen G, but some of the process in FIG. 10 may be executed by the external equipment such as the tablet terminal 6.

Note that the inspection object may be engines for aircrafts, various facilities in factories and the like although gas turbine engine for electric power generation has been described as an example of the inspection object in the above-described embodiment.

Furthermore, in the above-described embodiment, the inspection using the endoscope apparatus has been described, but the above-described embodiment can be applied also to an inspection using an inspection apparatus other than the endoscope apparatus, as exemplified by an ultrasound inspection apparatus that outputs an ultrasound image.

The present invention is not limited to the above-described embodiment, and various modifications, improvements and the like can be made in a range in which the spirit of the present invention is not changed.

What is claimed is:

1. A method, implemented by a processor, the method comprising:
    controlling a display to display an image of an inspection object including a plurality of inspection sites in a first display region of a display screen of the display;
    determining that an inspection site has been selected from the plurality of inspection sites;
    extracting first inspection information corresponding to the selected inspection site based at least in part on the determination that the inspection site has been selected, inspection information in which the first inspection information is included being stored in one of a plurality of folders corresponding to the plurality of inspection sites, the first inspection information being included in a first folder corresponding to the selected inspection site;
    extracting second inspection information corresponding to the selected inspection site based at least in part on the determination that the inspection site has been selected, the second inspection information having been generated prior to the first inspection information, inspection information in which the second inspection information is included being stored in another one of the plurality of folders corresponding to the plurality of inspection sites, the second inspection information being included in a second folder corresponding to the selected inspect site, the second folder being generated before the first folder is generated;
    controlling the display to display the first inspection information in a second display region of the display screen; and
    controlling the display to display the second inspection information in a third display region of the display screen, the first inspection information and the second inspection information being displayed concurrently in the display screen in the second display region and the third display region.

2. The method according to claim 1, wherein the second inspection information includes an image that is a latest image in the inspection information that was generated prior to the first inspection information and to which an evaluation equal to or lower than a predetermined level is given in predetermined evaluation information.

3. The method according to claim 1, wherein the second inspection information includes an image that is selected from the inspection information that was generated prior to the first inspection information based on predetermined evaluation information.

4. The method according to claim 3, wherein the second inspection information includes an image to which an evaluation equal to or lower than a predetermined level is given in the predetermined evaluation information.

5. The method according to claim 1, wherein the second inspection information includes an image that contains a defect region in the selected inspection site.

6. The method according to claim 1, wherein the second inspection information includes a latest image in the inspection information that was generated prior to the first inspection information.

7. The method according to claim 1, wherein the second inspection information includes an image that is extracted from an inspection report corresponding to the inspection object.

8. The method according to claim 7, comprising, when link information displayed in the third display region is selected, controlling the display to display the image extracted from the inspection report corresponding to the inspection object.

9. The method according to claim 1, further comprising controlling the display to display an image that is extracted from an inspection report corresponding to the inspection object, in a fourth display region.

10. The method according to claim 1, wherein the first inspection information includes an image corresponding to the selected inspection site.

11. The method according to claim 1, wherein the first inspection information is information that is narrowed in a predetermined condition.

12. The method according to claim 11, wherein the predetermined condition is specified by evaluation information that is included in the first inspection information.

13. The method according to claim 11, wherein the predetermined condition is specified by date information that is included in the first inspection information.

14. The method according to claim 1, further comprising creating an inspection report based on the selected inspection site or on a piece of inspection information that is selected from the first inspection information displayed in the second display region.

15. The method according to claim 1, wherein the second inspection information is stored in a server that is connected with a network.

16. The method according to claim 1, wherein:
determining that the inspection site has been selected from the plurality of inspection sites comprises determining that at least two inspection sites have been selected;
extracting the first inspection information corresponding to the selected inspection site based at least in part on the determination that the inspection site has been selected comprises extracting first inspection information corresponding to each of the at least two selected inspection sites; and
controlling the display to display the first inspection information in the second display region of the display screen comprises controlling the display to display the first inspection information corresponding to each of the at least two selected inspection sites in the second region of the display screen.

17. The method according to claim 1, wherein:
determining that the inspection site has been selected from the plurality of inspection sites comprises determining that at least two inspection sites have been selected;
extracting the second inspection information corresponding to the selected inspection site based at least in part on the determination that the inspection site has been selected comprises extracting second inspection information corresponding to each of the at least two selected inspection sites; and
controlling the display to display the second inspection information in the third display region of the display screen comprises controlling the display to display the second inspection information corresponding to each of the at least two selected inspection sites in the third region of the display screen.

18. The method according to claim 1, further comprising:
setting the plurality of folders;
setting at least one folder of the plurality of folders; and
recording the image of the inspection object after setting the at least one folder, to store the image of the inspection object in the set folder,
wherein recording of the image of the inspection object is performed before displaying of the image of the inspection object in the first display region.

19. The method according to claim 18, wherein setting the at least one folder comprises reading the first folder stored in advance and setting the first folder.

20. An apparatus comprising at least one processor, the at least one processor being configured to:
control a display to display an image of an inspection object including a plurality of inspection sites in a first display region of a display screen of the display;
determine that an inspection site has been selected from the plurality of inspection sites;
extract first inspection information corresponding to the selected inspection site based at least in part on the determination that the inspection site has been selected, inspection information in which the first inspection information is included being stored in one of a plurality of folders corresponding to the plurality of inspection sites, the first inspection information being included in a first folder corresponding to the selected inspection site;
extract second inspection information corresponding to the selected inspection site based at least in part on the determination that the inspection site has been selected, the second inspection information having been generated prior to the first inspection information, inspection information in which the second inspection information is included being stored in another one of the plurality of folders corresponding to the plurality of inspection sites, the second inspection information being included in a second folder corresponding to the selected inspect site, the second folder being generated before the first folder is generated;
control the display to display the first inspection information in a second display region of the display screen; and
control the display to display the second inspection information in a third display region of the display screen, the first inspection information and the second inspection information being displayed concurrently in the display screen in the second display region and the third display region.

* * * * *